United States Patent
Hiroi et al.

(10) Patent No.: US 7,817,809 B2
(45) Date of Patent: Oct. 19, 2010

(54) EDITING DEVICE AND AUDIO SIGNAL PROCESSING SYSTEM

(75) Inventors: Makoto Hiroi, Hamamatsu (JP); Hiromu Miyamoto, Hamamatsu (JP); Toshiyuki Ito, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1199 days.

(21) Appl. No.: 11/373,882

(22) Filed: Mar. 9, 2006

(65) Prior Publication Data
US 2006/0202873 A1   Sep. 14, 2006

(30) Foreign Application Priority Data
Mar. 11, 2005 (JP) ............................. 2005-069695

(51) Int. Cl.
*H04B 1/00* (2006.01)
(52) U.S. Cl. ............................. 381/119; 700/94; 369/4
(58) Field of Classification Search ................ 381/109, 381/119; 700/94; 84/625, 660, 697; 369/3–4
See application file for complete search history.

(56) References Cited

U.S. PATENT DOCUMENTS

| | | | |
|---|---|---|---|
| 5,862,231 A | 1/1999 | Tokuhisa | |
| 7,409,252 B2 * | 8/2008 | Iida | ............................. 700/94 |
| 7,558,637 B2 * | 7/2009 | Takemura et al. | ............. 700/94 |
| 2002/0188364 A1 * | 12/2002 | Ota et al. | ....................... 700/94 |

FOREIGN PATENT DOCUMENTS

JP   2001-282574 A   10/2001

OTHER PUBLICATIONS

DME Design Version 1.0 Owner's Manual, Yamaha Corporation, Japan.
Notification of Reason(s) for Refusal mailed May 19, 2009, for JP Application No. 2005-069695, with English translation, six pages.
Yamaha. (2001). Digital Mixing Engine DME 32 Owner's Manual, pp. 2,3,45-59, English language.
Yamaha. (2001). Digital Mixing Engine DME 32 Owner's Manual, pp. 2,3,45-59, Japanese language.

* cited by examiner

*Primary Examiner*—Devona E Faulk
*Assistant Examiner*—Disler Paul
(74) *Attorney, Agent, or Firm*—Morrison & Foerster LLP

(57) ABSTRACT

When a PC connected to a mixer engine functions as an editing device to edit a configuration of signal processing in the mixer engine, components and wires included in the edited configuration of signal processing are displayed within a CAD screen on a display of the PC, and a delay amount occurring in processing corresponding to each of the components and wires when the mixer engine executes the signal processing is displayed in correspondence with each of the components and wires on the CAD screen. In this case, the delay amount corresponding to each wire is a value determined according to a result of assignment in which signal processing corresponding to each component is assigned to a plurality of signal processors in the mixer engine.

8 Claims, 10 Drawing Sheets

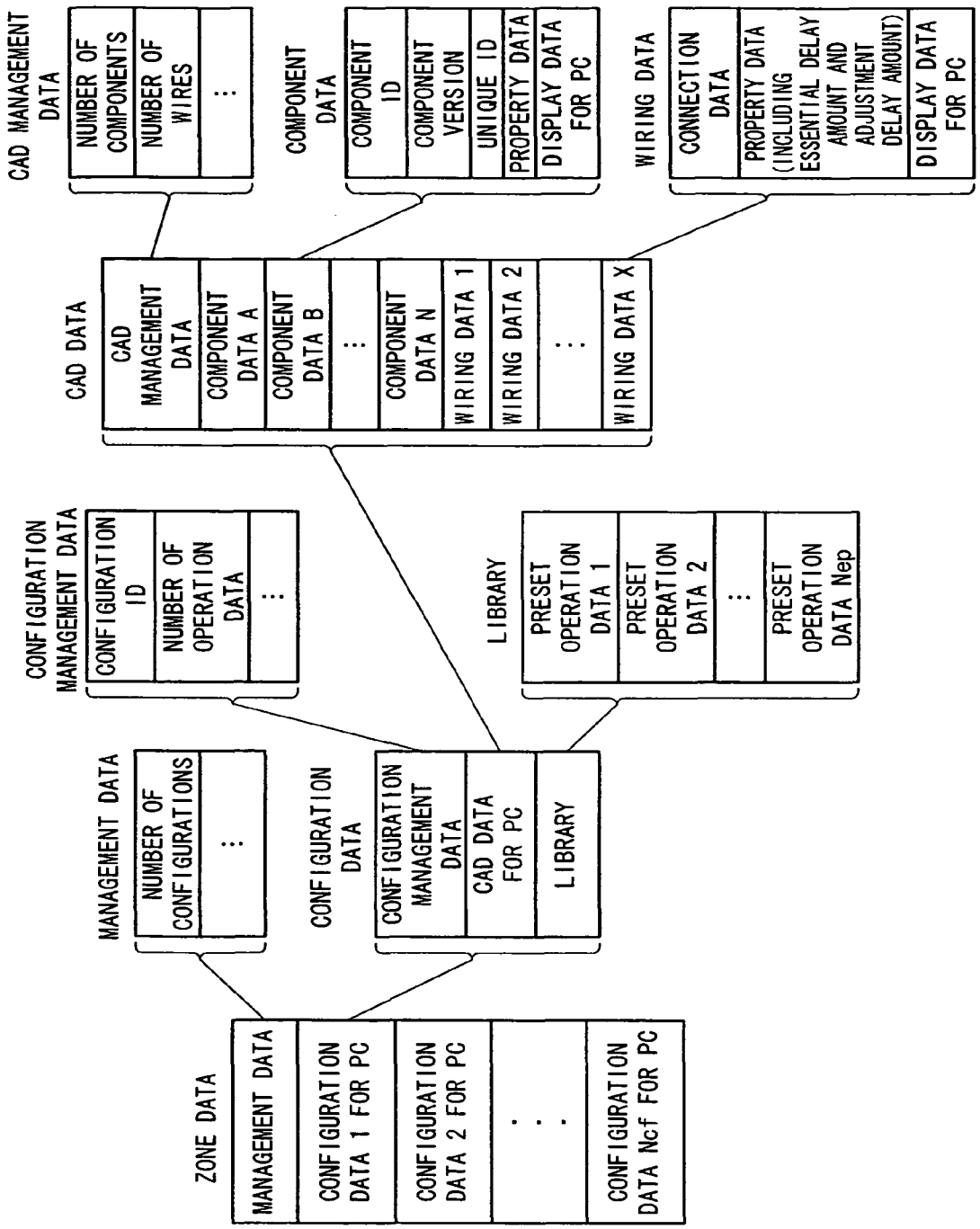

EDITING DEVICE AND AUDIO SIGNAL PROCESSING SYSTEM

BACKGROUND OF THE INVENTION

1. Field of the Invention

The invention relates to an editing device for editing a configuration of signal processing to be performed in an audio signal processing device, an audio signal processing system including such an editing device and the audio signal processing device that performs the signal processing in the configuration edited by the editing device, and a program for causing a computer to function as the editing device as described above.

2. Description of the Related Art

Conventionally, there has been a well-known audio signal processing device in which an audio signal processing module is composed using a processor operable following a program to be able to process audio signals based on a configuration of signal processing edited using an external computer such as a PC (personal computer) or the like. Such an audio signal processing device is called a mixer engine in the present application. The mixer engine stores therein the configuration of signal processing edited by the PC and can independently perform processing on audio signals based on the stored configuration of signal processing.

Besides, the edit of the configuration of signal processing on the computer can be performed using dedicated application software, and there is known application software for enabling components for the signal processing and a wiring status between their input and output nodes to be graphically displayed on a display in editing to allow users to perform editing work in an environment where the configuration of signal processing can be easily grasped visually. Then, a user can arrange desired processing components and set wires between the arranged components, thereby editing the configuration of signal processing.

The audio signal processing system described above and the application software for causing a computer to function as the editing device is described, for example, in Owner's Manual of "DME Designer (trade name) Version 1.0" available from YAMAHA Co.

SUMMARY OF THE INVENTION

When the audio signal processing device described above is operated, actually the processor provided in the audio signal processing device executes a microprogram based on the edited configuration of signal processing. In this case, for processing corresponding to each component, an appropriate processing time is required. Accordingly, delay occurs corresponding to the processing time from input of a signal into the audio signal processor to output thereof, and the delay amount differs depending on the component through which the signal passes. Therefore, phase shift by the differential in the delay amount will be caused in the output signal. This also applies to a signal during processing.

Further, transfer processing of data corresponding to a wire between components may require an appropriate processing time, in which case delay also occurs. In addition, the delay amount occurring due to the transfer processing may differ depending on a procedure of signal processing executed by the processor, and if there are a plurality of processors, the delay amount differs also depending on whether transfer among the processors is required or not.

Incidentally, when processing of mixing a plurality of audio signals is performed, characteristics of the signals after mixing change depending on the relative phase relation between input signals. In such a case, it has been demanded that the phase relation between the plurality of input signals is made identical to the phase relation when the signals are inputted into the mixer engine.

To meet the demand, such adjustment is possible, in a conventional mixer that performs fixed processing, by managing the delay amount caused by the processing and designing a circuit so as to match the signals in phase on the manufacturer side. Such handling, however, is impossible in the configuration in which the processor executes the microprogram based on the configuration of signal processing edited by the user, and therefore it is necessary to adjust the delay amounts at the time of editing the configuration of signal processing.

To attain the above object, an editing device of the invention is an editing device that edits a configuration of signal processing performed in an audio signal processing device having an audio signal processor including a plurality of signal processors and a communication path between the signal processors, the configuration having a plurality of components each having an input node and an output node and wires each connecting the output node and the input node of the components, which comprises: a first display controller that causes a display to display each of the components and wires included in the edited configuration of signal processing; an assigning device that assigns the signal processing relating to each of the components included in the edited configuration of signal processing to any of the signal processors; and a second display controller that causes the display to display a delay amount of a signal occurring in processing corresponding to each of the components and wires included in the configuration of signal processing when the audio signal processor performs the signal processing in the edited configuration in correspondence with each of the components and wires, in accordance with a result of assignment by the assigning device.

In such an editing device, it is preferable to provide a device that adds a not-shown delay component into the edited configuration of signal processing in correspondence with each of the wires included in the configuration, the delay component delaying a signal passing through the wire, that the assigning device is a device that performs the assignment to be able to ensure processing ability required for the delay processing by the delay component, and that the second display controller is a device that causes the display to display, as the delay amount corresponding to the wire, a total amount of a delay amount unavoidably occurring in the signal processing relating to the wire with the assignment of the signal processing by the assigning device and a delay amount by the delay processing by the delay component.

Further, it is preferable to provide a device that sets an amount by which a signal is delayed by the delay component according to a direction of a user.

Further, in the above-described editing device, it is preferable that a delay amount unavoidably occurring in the signal processing relating to the wire with the assignment of the signal processing by the assigning device is an essential delay amount, that an adjusting device is provided, the adjusting device adjusting the delay amount occurring in the signal processing corresponding to each of the wires such that the delay amount is a fixed value equal to or greater than a greatest amount which may be the essential delay amount, in accordance with a result of assignment when the assigning device performs the assignment, and that the assigning device is a device that performs the assignment to be able to ensure processing ability required for the adjustment by the adjusting device.

In such an editing device, it is preferable to provide a device that adds a not-shown delay component into the edited configuration of signal processing in correspondence with each of the wires included in the configuration, the delay component delaying a signal passing through the wire, and that the adjusting device is provided with a device that performs the adjustment by setting a delay amount by the delay component corresponding to each of the wires to an appropriate value.

Moreover, it is preferable that the delay amount by the delay component is made manually changeable after the setting by the adjusting device to an amount greater than the amount set by the adjusting device.

Furthermore, in the above-described editing device, it is preferable that a delay amount unavoidably occurring in the signal processing relating to the wire with the assignment of the signal processing by the assigning device is an essential delay amount, and that an adjusting device is provided, the adjusting device adjusting the delay amount occurring in the signal processing corresponding to each of the wires such that the delay amount is a fixed value equal to or greater than a greatest amount which may be the essential delay amount, by determining a delay amount by the delay component in accordance with a result of assignment when the assigning device performs the assignment.

Further, in the editing device, it is preferable that the adjusting device is provided with a device that performs the adjustment so that even when the assigning device performs assignment again, the delay amount occurring in the signal processing corresponding to each of the wires does not change between before and after the reassignment.

Moreover, an audio signal processing system of the invention is an audio signal processing system including: the above-described editing device; and an audio signal processing device having an audio signal processor including a plurality of signal processors and a communication path between the signal processors, the audio signal processor performing the signal processing in the configuration edited by the editing device.

Furthermore, a computer program of the invention is a program for causing a computer to function as the above-described editing device.

The above and other objects, features and advantages of the invention will be apparent from the following detailed description which is to be read in conjunction with the accompanying drawings.

BRIEF DESCRIPTION OF THE DRAWINGS

FIG. 5 is a diagram showing another portion of the data;

FIG. 7 is a diagram showing a display example of the CAD screen in the delay display state when a FIX mode is ON;

DETAILED DESCRIPTION OF THE PREFERRED EMBODIMENTS

Hereinafter, a preferred embodiment of the invention will be concretely described with reference to the drawings.

Figure 1:
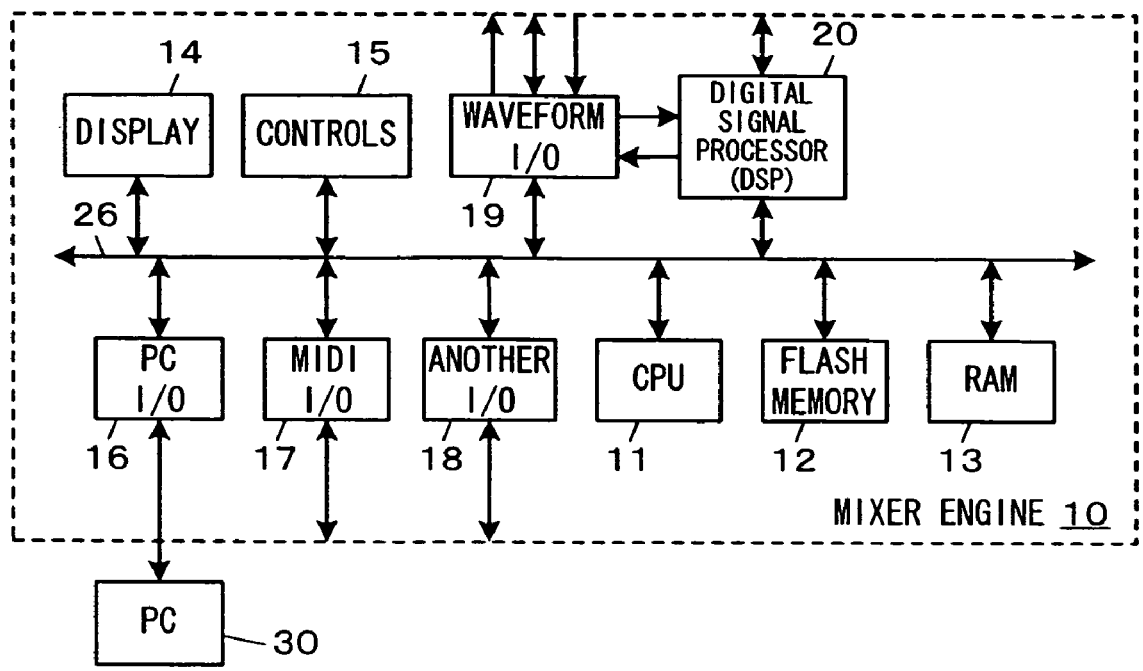
FIG. 1 is a block diagram showing a configuration of a mixer system being an embodiment of an audio signal processing system of the invention with a PC being an editing device of the invention and a mixer engine being an audio signal processing device.

A configuration of a mixer system being an embodiment of an audio signal processing system of the invention which comprises a PC being an editing device of the invention and a mixer engine being an audio signal processing device will first be described using FIG. 1. FIG. 1 is a block diagram showing the configuration of the mixer system.

As shown in FIG. 1, the mixer system comprises a mixer engine 10 and a PC 30. The PC 30 can employ, as hardware, a well-known PC having a CPU, a ROM, a RAM and so on and a display, that is, a PC on which an operating system (OS) such as Windows XP (registered trademark) runs. By executing an edit program being an embodiment of a program of the invention as an application program on the OS, the PC 30 can function as the editing device to edit a configuration of signal processing to be executed by the mixer engine 10, transfer the edit result to the mixer engine 10, and cause the mixer engine 10 to operate in accordance with the edited configuration of signal processing. The operation and function of the PC 30 described below should be realized by executing the edit program unless otherwise stated.

On the other hand, the mixer engine 10 includes a CPU 11, a flash memory 12, a RAM 13, a display 14, controls 15, a PC input and output module (I/O) 16, a MIDI (Musical Instruments Digital Interface) I/O 17, another I/O 18, a waveform I/O 19, and a digital signal processor (DSP) 20, which are connected by a CPU bus 26. The mixer engine 10 has functions of generating a microprogram for controlling the DSP 20 in accordance with the configuration of signal processing received from the PC 30, operating the DSP 20 in accordance with the microprogram to thereby perform various signal processing on inputted audio signals and output them.

The CPU 11, which is a controller that comprehensively controls operation of the mixer engine 10, executes a predetermined program stored in the flash memory 12 to thereby perform processing such as controlling communication at each of the I/Os 16 to 19 and 26 and display on the display 14, detecting operations at the controls 15 and changing values of parameters in accordance with the operations, and generating the microprogram for operating the DSP 20 from data on the configuration of signal processing received from the PC 30 and installing the program in the DSP 20.

The flash memory 12 is a rewritable non-volatile memory that stores a control program executed by the CPU 11, later-described preset component data and so on.

The RAM 13 is a memory that stores various kinds of data including later-described configuration data generated by converting the data on the configuration of signal processing received from the PC 30 into a required form and current data, and is used as a work memory by the CPU 11.

The display 14 is a display composed of a liquid crystal display (LCD) or the like. The display 14 displays a screen for indicating the current state of the mixer engine 10, a screen for referring to, modifying, saving, and so on of scenes being setting data contained in the configuration data, and so on.

The controls 15 are controls composed of keys, switches, rotary encoders, and so on, with which a user directly operates the mixer engine 10 to edit scenes and so on.

The PC I/O 16 is an interface for communicating with the PC 30, and can be an interface of, for example, a USB (Universal Serial Bus) standard, an Ethernet® standard, or the like.

The MIDI I/O 17 is an interface for sending and receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP 20 and outputting processed audio signals. A plurality of A/D conversion boards each capable of analog input of four channels, D/A conversion boards each capable of analog output of four channels, and digital input and output boards each capable of digital input and output of eight channels, can be installed in combination as necessary into the waveform I/O 19, which actually inputs and outputs signals through the boards.

The another I/O 18 is an interface for connecting devices other than the above-described to perform input and output, and for example, interfaces for connecting a display, a mouse, a keyboard for inputting characters, a control panel, and so on in an external part are prepared.

The DSP 20 is a signal processor which includes a signal processing circuit to perform processing on audio signals inputted from the waveform I/O 19 in accordance with the installed microprogram and the current data determining its processing parameters.

Figure 2:
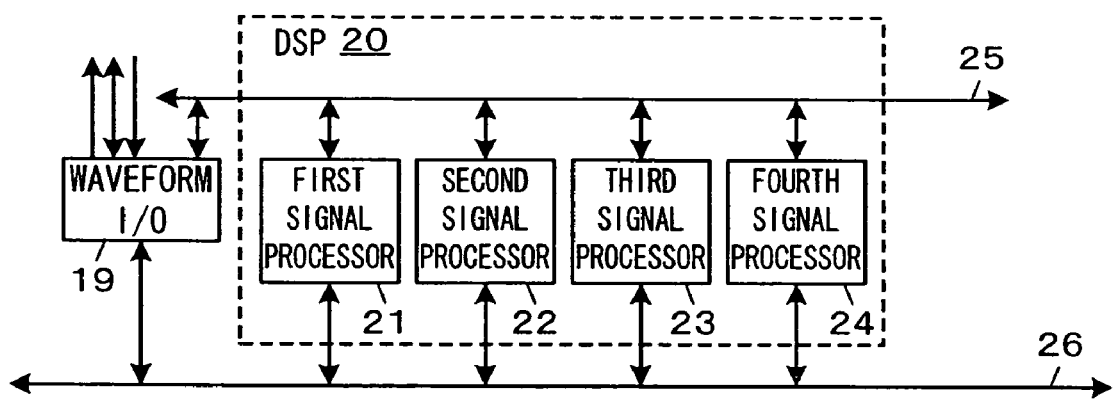
FIG. 2 is a diagram showing a configuration of a DSP and its periphery shown in FIG. 1 in more detail.

The configuration of the DSP 20 and its periphery is shown in more detail in FIG. 2.

The DSP 20 is constituted here of four, that is, a first to a fourth signal processor 21 to 24 connected as shown in FIG. 2. Further, the signal processors and the waveform I/O 19 are connected to a waveform bus 25 to transfer the signal being a processing object via the waveform bus 25. Note that the signal processors 21 to 24 correspond to signal processors, respectively.

Further, the waveform bus 25 can transmit a 24-bit signal via 128 channels on a time division basis, and each channel functions as a communication path (signal transmission channel) for transmitting a signal from the output of any of the signal processors or the I/Os connected to the waveform bus 25 to the input of another signal processor or I/O. More specifically, the channels are assigned to the output side and the input side, and the output of each of the signal processors and I/Os outputs a signal to the channel assigned thereto as the output destination and the input of each of the signal processors and I/Os fetches the signal from the channel assigned thereto as the input source to thereby enable transmission of the signal. Further, this assignment is basically performed by a microprogram for controlling the DSP 20.

Figure 3:
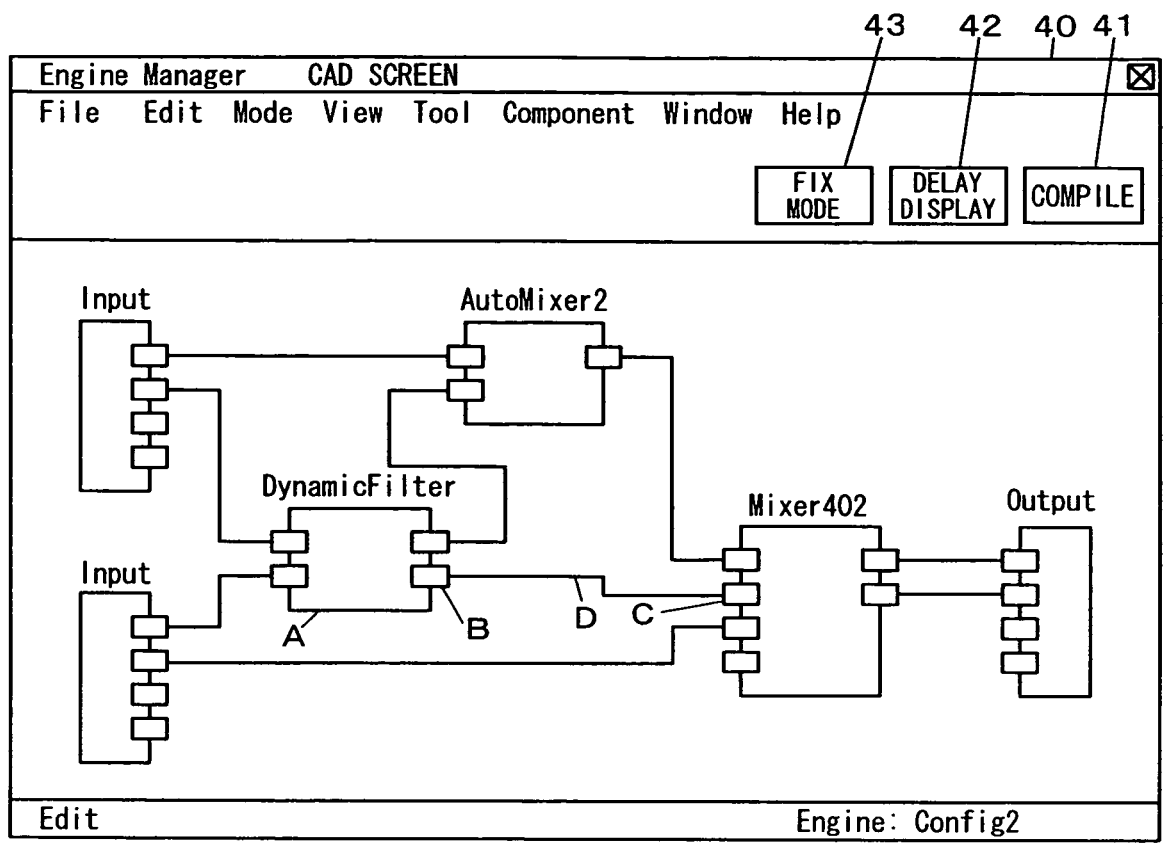
FIG. 3 is a diagram showing an example of an edit screen of a signal processing configuration displayed on a display of the PC shown in FIG. 1.

Next, an editing scheme of the configuration of signal processing in the PC 30 will be described. FIG. 3 is a diagram showing an example of an edit screen of a signal processing configuration displayed on the display of the PC 30.

When the user causes the PC 30 to execute the above-described edit program, the PC 30 causes the display to display a CAD (Computer Aided Design) screen 40 as shown in FIG. 3 to accept an edit direction from the user. In this screen, the configuration of signal processing during the edit is graphically displayed by components (A) such as a DynamicFilter, an AutoMixer2, a Mixer402 and the like and wires (D) connecting output nodes (B) and input nodes (C) of the components. Note that the nodes displayed on the left side of the components are the input nodes, and the nodes displayed on the right side are the output nodes. The components which exhibit input to the mixer engine 10 have only the output nodes, the components which exhibit output from the mixer engine 10 have only the input nodes, and all the other components have both the input nodes and the output nodes. Further, the CPU of the PC 30 functions as a first display controller when causing the display to display the CAD screen 40.

In this screen, the user can select components desired to be added to the configuration of signal processing from a component list displayed by operation of a "Component" menu, arrange them on the screen, and designate wires between any of the output nodes and any of the input nodes of the plurality of components arranged, to thereby edit the configuration of signal processing. By directing execution of "Save" in a "File" menu, the edited result is saved as a configuration (config). Further, by directing execution of compile by pressing a compile button 41 (including clicking the mouse button or the like, and this applies to following cases), the data format of a part of the configuration data can be converted into the data format for the mixer engine, and then the configuration data can be transferred to and stored in the mixer engine 10. A delay display button 42 and a FIX button 43 will be described later.

It should be noted that the PC 30 calculates, during the edit, the resource amount required for the signal processing in accordance with the signal processing configuration on the screen, and if the amount exceeds the resource of the DSP 20 provided in the mixer engine 10, the mixer engine 10 cannot perform such processing, and therefore the PC 30 notifies the user of it.

Further, for each of the components included in the configuration of signal processing, a storage region for storing parameters of the component (for example, the level of each input or the like if it is a mixer) is prepared, when the component is newly disposed in the configuration of signal processing and compiled, in the current memory where the current data is stored, and predetermined initial values are given as the parameters.

Then, the user can edit the parameters stored in the parameter storage region by operating a parameter control panel provided for each component. Further, a plurality of resultant parameters edited here and stored in the current memory are stored in a library in a configuration, as preset operation data being setting data on the configuration, so that the parameters can be arbitrarily recalled to the current memory when the mixer engine 10 performs signal processing in accordance with the configuration.

Further, the user can set either a non-online mode or an online mode as the operation mode of the mixer engine 10 and the PC 30. In the non-online mode, the mixer engine 10 and the PC 30 operate independently from each other, while, in the online mode, they operate maintaining mutual synchronization of parameters and so on in the current memory. They can shift to the online mode only when the configuration of signal processing of the mixer engine 10 matches the configuration of signal processing of the PC 30. In the online mode, the mixer engine 10 and the PC 30 are controlled (synchronized) such that their current data become identical.

The configuration of data relating to the invention for use in the above-described mixer system will be described below.

Figure 4A:
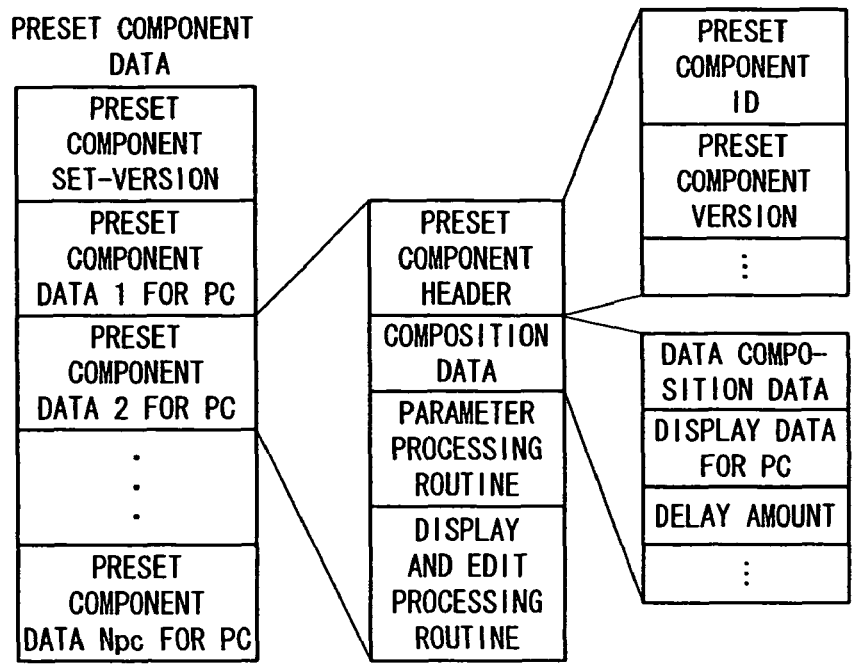
FIG. 4A to FIG. 4C are diagrams each showing a portion of a configuration of data to be stored on the PC side among data relating to the invention.

First, the configuration of data for use on the PC 30 side will be shown in FIG. 4A to FIG. 5.

When the above-described control program runs on the OS of the PC 30, the PC 30 stores data as shown in FIG. 4A to FIG. 5 in a memory space defined by the control program.

Of them, the preset component data set shown in FIG. 4A is a set of data on components which can be used in editing the configuration of signal processing and basically supplied from its manufacturer, although it may be configured to be customizable by the user. The preset component data set includes data of preset component set-version data being version data for managing the version as the whole data set, and preset component data for PC prepared for each kind of the plurality of components constituting the data set.

Each preset component data for PC, which is data indicating the property and function of a component, includes: a preset component header for identifying the component; composition data showing the composition of the input and output of the component and data and parameters that the component handles; a parameter processing routine for performing processing of changing the value of the parameter relating to each component in the above-described current data in accordance with the operation by the user; and a display and edit processing routine for converting the values of the parameters relating to each component in the current data into text data or a characteristic graph for display.

The preset component header includes data on a preset component ID being identification data indicating the kind of the preset component and a preset component version data indicating its version, with which the preset component can be identified.

The above-described composition data also includes: the name of the component; display data indicating appearance such as color, shape, and so on when the component itself is displayed in the edit screen, the design of the control panel displayed on the display for editing the parameters of that component, and the arrangement of the knobs and the characteristic graph on the control panel; data indicating the delay amount occurring in the signal processing corresponding to the component; and so on, as well as the input and output composition data indicating the composition of the input and output of the component, and the data composition data indicating the composition of data and parameters that the component handles.

Of the preset component data for PC, the display data required for edit on the edit screen in graphic display in the configuration data, the routine for displaying the values of parameters on the control panel in a graph and so on in the display and edit processing routine are data unnecessary for the operation on the mixer engine 10 side and therefore stored only on the PC 30 side.

On the other hand, zone data shown in FIG. 5 includes management data and one or more pieces of configuration data for PC.

The management data of the above-described zone data is data for managing the zone data and includes data such as the number of configurations indicating the number of pieces of configuration data for PC included in the zone data, and so on.

The configuration data for PC is data indicating contents of the signal processing configuration edited by the user and, when the user selects save of the edit result, the signal processing configuration, the values of parameters and so on at that point in time are saved as one piece of configuration data for PC. Further, the user can select one piece of configuration data for PC as the configuration data to be edited. In this case, the PC 30 (in the process of the edit program) prepares edit of the configuration data for PC (performs preparation for access to the CAD data for PC, reservation of a storage region for current data, and so on).

Each configuration data for PC includes configuration management data for identifying the configuration data; CAD data for PC indicating contents of the edited configuration of signal processing; and a library composed of any number of pieces of preset operation data, each of which is a set of values of processing parameters when the mixer engine 10 executes the audio signal processing indicated by the CAD data for PC.

Among these, the configuration management data includes data such as a configuration ID uniquely assigned when the configuration is newly saved, the number of pieces of operation data indicating the number of pieces of preset operation data included in the library, and so on.

Further, by directing through the CAD screen 40, the user can save the contents of the current data as the preset operation data about the configuration in use for signal processing, and recall the contents of the preset operation data as the current data.

On the other hand, the CAD data for PC includes CAD management data; component data on each component included in the edited configuration of signal processing; and wiring data indicating each wiring status between the components. Note that if a plurality of preset components of the same kind are included in the edited configuration of signal processing, discrete component data is prepared for each of them. Further, the CAD management data includes data indicating the number of components and the number of wires in the CAD data.

Each component data includes: a component ID indicating what preset component that component corresponds to; a component version indicating what version of preset component that component corresponds to; a unique ID being an ID uniquely assigned to that component in the configuration in which that component is included; property data being data for defining details of contents of signal processing executed in that component; and display data for PC indicating the position where the corresponding component is arranged in the edit screen on the PC 30 side; and so on.

Besides, each wiring data includes, for each wire included in the edited configuration of signal processing: connection data indicating what output node of what component is being wired to what input node of what component; property data including data on the kind and the thickness of a wire when that wire is displayed on the CAD screen 40, delay amount occurring during transfer of data corresponding to that wire, and so on; and display data for PC indicating the shape and arrangement of that wire in the CAD screen 40. Further, the delay amount includes an essential delay amount and an adjustment delay amount, which will be described later.

The above data may be stored in a non-volatile memory such as an HDD (hard disk drive) or the like and read out into the RAM for use when required.

Figure 4B:
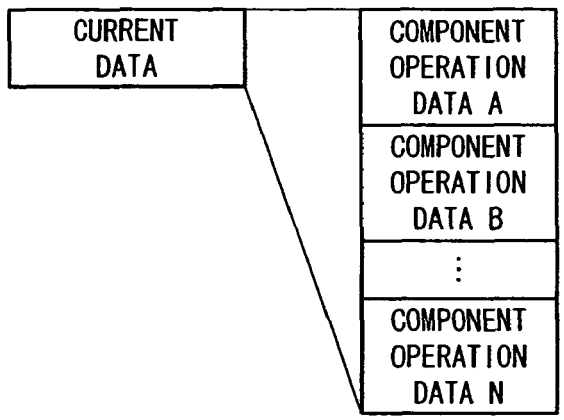

In addition, the PC 30 also stores, as shown in FIG. 4B, the current data indicating the currently effective values of parameters in the configuration in use for signal processing. The current data is in a form in which operation data for each of components in the signal processing configuration in that configuration are combined, so that when the values of the parameters about the components in the configuration of signal processing are edited on the control screen or the like, the values of the parameters about the components in the current data are changed. The result can be saved as one piece of preset operation data as described above.

Figure 4C:
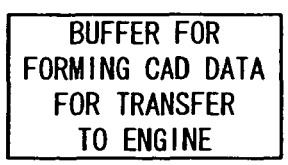

Further, in the PC 30, as shown in FIG. 4C, a buffer is also provided for forming, from the CAD data for PC, CAD data for transfer to engine when transferring the configuration data to the mixer engine 10 in the above-described "Compile" processing. Note that the CAD data for transfer to engine is created by deleting from the CAD data for PC the data not in use on the mixer engine 10 side such as the above-described display data for PC on the component and wire and further cutting off a portion not in use between the data for packing.

Though not shown, also on the mixer engine 10 side, preset component data and configuration data are stored as primary data. Incidentally, their configuration contents are slightly different from those on the PC 30 side.

More specifically, first of all, the preset component data on the mixer engine 10 side includes preset component data for engine instead of the preset component data for PC. The preset component data for engine is different from the preset component data for PC in that it includes the microprogram for operating the DSP 20 to function as the component, in place of a part of the display and edit routine. The preset component data for engine is different from that for PC also in that it does not include the display data for PC and the data on the delay amount in composition data.

In other words, since edit of the configuration of signal processing and display of the characteristic graph of the parameter are not performed on the mixer engine 10 side, the display data for PC included in the composition data for the PC and a portion of the display and edit routine for PC are not necessary, and data to be displayed on the display about the delay amount is also unnecessary. Note that also on the mixer engine 10 side, the setting values of parameters can be displayed on the display 14 and edited by the controls 15. Therefore, the routine for converting the values of the parameters into text data for display among the display and edit routine for PC is required and included in the parameter processing routine.

Note that the same ID and version as those of the corresponding sets and components on the PC 30 side are used to enable recognition of the correspondence therebetween.

Further, as for the configuration data, the data on the mixer engine 10 side is different from that on the PC 30 side in that it includes CAD data for engine in place of the CAD data for PC. Here, the CAD data for engine is the CAD data for transfer to engine received from the PC 30 and stored, which is created by deleting the display data for PC from the CAD data for PC and packing as described above.

Besides, the mixer engine 10 is for processing audio signals based on the configuration of signal processing edited on the PC 30. Accordingly, the CPU 11 forms the microprogram which the DSP 20 executes, based on the CAD data for engine received from the PC 30, and thus has a microprogram forming buffer prepared as a work area for the formation.

Next, a mode of displaying the delay amount in the edit of the configuration of signal processing using the PC 30 and processing therefor will be described.

Figure 6:
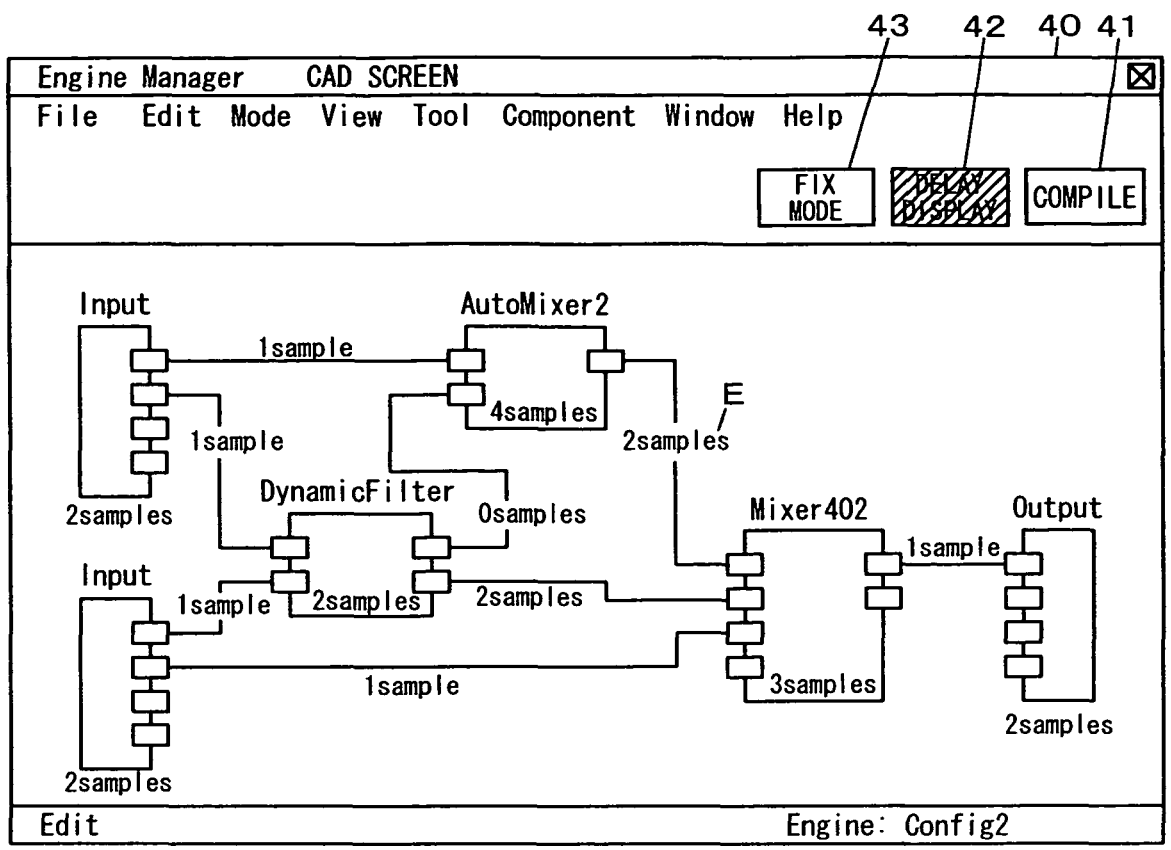
FIG. 6 is a diagram showing a display example of a CAD screen in a delay display state.

A display example of the CAD screen in the delay display state is first shown in FIG. 6.

It has been described that the configuration of signal processing can be edited on the CAD screen 40 as shown in FIG. 3 in this mixer system. When the user presses the delay display button 42 on this screen, the display on the CAD screen 40 is changed to display of the delay display state as shown in FIG. 6.

In this state, within the CAD screen 40, components and wires placed in the edit of the configuration of signal processing are displayed as they are, and the delay amount of a signal occurring in processing corresponding to each of the components and wires is displayed corresponding to each of the components and wires as shown by a symbol E.

Further, the delay amount corresponding to a component is displayed within or near the frame of the component, and the delay amount corresponding to a wire is displayed near the midpoint of the wire. The delay amount is displayed taking a DAC (digital-analog conversion) time being a sampling cycle (=sampling cycle of D/A conversion at the time of outputting a signal) of a signal processed in the DSP 20, as a unit, "sample" indicating the sampling cycle being used here as the unit.

Note that delay of a signal, in processing corresponding to each component, is delay occurring due to delay included in the algorism of the processing (delay in a unit of a sampling circuit), and its delay amount is fixed for each kind of components. Accordingly, as shown in FIG. 4A, the delay amount corresponding to the kind of component is described in the preset component data so that delay amount is displayed referring to the described value.

On the other hand, delay occurring due to processing corresponding to each wire differs depending on the processors that perform processing corresponding to components at both ends of the wire and on the processing orders in the processors.

More specifically, in the mixer engine 10, the plurality of signal processors 21 to 24 are provided in the DSP 20 as shown in FIG. 2, so that when the mixer engine 10 executes the signal processing in the configuration edited in the PC 30, the signal processing presented by each component is assigned to any of the signal processors so that the signal processor executes the signal processing.

Accordingly, in the case where the signal processing relating to a preceding component and the signal processing relating to a following component are assigned to different signal processors, data transfer between these processors is required to pass the data between these components (processing relating to a wire). This processing, in turn, requires a time corresponding to two sampling cycles for preparation for transfer to the waveform bus 25 and transfer processing over the waveform bus 25, thus causing delay of a signal by the amount corresponding to that time.

Besides, even in the case where the signal processing relating to the preceding and following components are assigned to the same signal processor, if, as the processing timing in the processor, a timing is assigned to the processing relating to the following component earlier than that to the processing relating to the preceding component, the following processing using the data after the preceding processing cannot be immediately performed but will be performed in a next sampling cycle, thus causing delay by one sampling cycle. In contrast, if a timing is assigned to the processing relating to the preceding component earlier than that to the processing relating to the following component, the following processing can be immediately performed using the data after the preceding processing, thus causing no delay.

Accordingly, display of delay amount corresponding to a wire is performed such that signal processing relating to each component is assigned to one of the signal processors 21 to 24 and then the delay amount is found based on the assignment contents, the amount being used for the display. It should be noted that the delay amount described here is the delay amount unavoidably occurring during performance of processing corresponding to the configuration of signal processing, which is the essential delay amount.

The display performed as described above allows the user to easily grasp the delay amount occurring in each portion of the signal processing according to the edited configuration of signal processing. In addition, the delay amount of a signal occurring in the processing corresponding to each of the components and wires is displayed near them to correspond to the component or wire, so that the delay amount of each signal to be inputted into each component can be easily estimated by following the path of the signal, and the ratio between the delay corresponding to components and the delay corresponding to wires on that path can be grasped.

Furthermore, in this case, the delay amount corresponding to a component uniquely determined from the kind of the component and the delay amount corresponding to a wire varying according to the contents of assignment of signal processing to processors are separately displayed, so that the delay amount displayed corresponding to a component can be an inherent delay amount unaffected by the signal processor to which the component is assigned and the processing timing, whereby the appearance of the whole delay can be displayed in a clearly understandable form.

Incidentally, if the delay amount corresponding to a wire is changed depending on a situation despite the same signal processing configuration, adjustment becomes difficult which matches delay amounts of input signals at a component into which a plurality of signals are inputted, or matches delay amounts of signals at the time of their outputting.

Hence, in this mixer system, a FIX (fixed) mode is prepared, in which delay amounts corresponding to wires are automatically adjusted to a fixed value.

Figure 7:
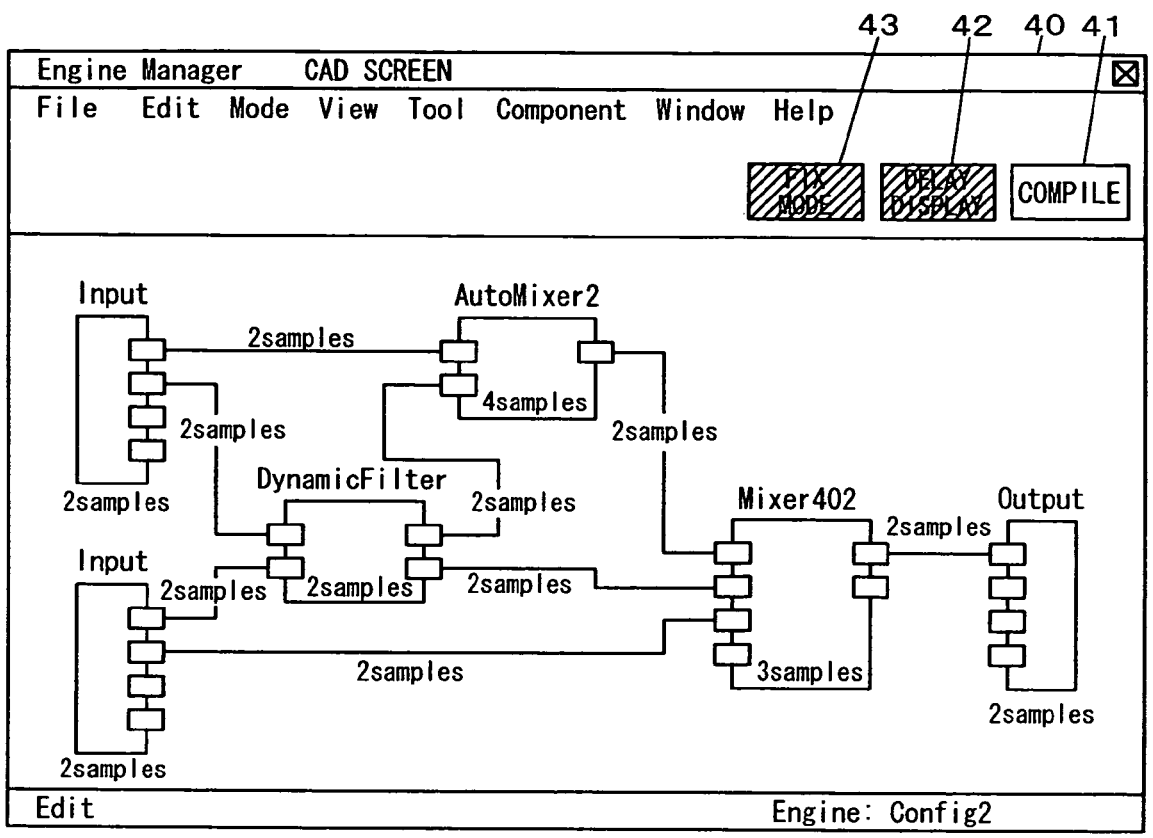

Next, a display example of the CAD screen in a delay display state when the FIX mode is ON is shown in FIG. 7.

In this mixer system, the user can press the FIX button 43 on the CAD screen 40 as shown in FIG. 3 or FIG. 6 to toggle ON/OF of the FIX mode. The display of the CAD screen 40 in the case of the delay display state in the FIX mode is such as shown in FIG. 7.

This display is the same as that shown in FIG. 6 in that, in addition to components and wires arranged in editing the configuration of signal processing, a delay amount of a signal occurring in the processing corresponding to each of the components and wires is displayed corresponding to the component or wire in the CAD screen 40.

In the state of the FIX mode, however, the delay amount corresponding to each wire is automatically adjusted to a fixed value, whereby the delay amount to be displayed corresponding to each wire is fixed for all wires.

Since the adjustment to reduce the delay amount cannot be performed here, the adjustment of the delay amounts is performed such that the delay amount on a wire with a smaller delay amount is made greater so that the delay amounts on wires match the maximum value of the delay amounts which may unavoidably occur in the signal processing relating to the wires. As describe above, since the essential delay amounts in the signal processing relating to the wires are any of 0, 1, or 2 sample cycles, the delay amounts corresponding to the wires are designed to match the two sample cycles that is the maximum value among them. Note that it is possible to match the delay amounts to a value greater than that.

Figure 8:
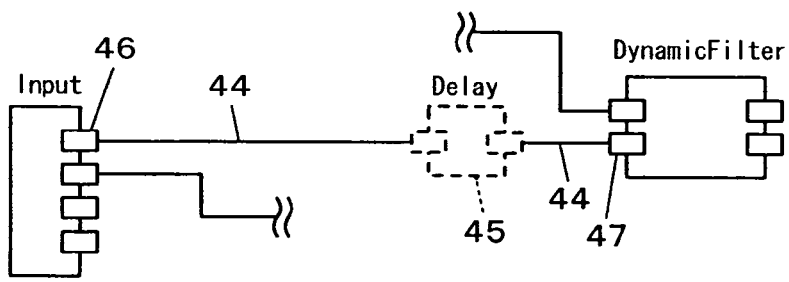
FIG. 8 is a diagram for explaining a not-shown delay component.

Such adjustment is performed, as shown in FIG. 8, such that, in addition to the configuration of the signal processing edited on the CAD screen 40, a not-shown delay component (delay processor) 45 is added corresponding to a wire 44 included in the configuration which delays a signal passing through the wire 44, so that a differential between the essential delay amount being the delay amount unavoidably occurring on each wire and the delay amount after adjustment is delayed by the delay component.

For example, if the essential delay amount in the signal processing relating to a certain wire is one sampling cycle, and this essential delay amount is adjusted so that the delay amount is two sampling cycles, it is only required for the delay component to perform delay by one sampling cycle. Alternatively, if the essential delay amount is originally two sampling cycles, it is unnecessary for the delay component to perform delay.

The delay amount delayed by the not-shown delay component is an adjustment delay amount corresponding to the wire. The delay amount displayed on the CAD screen 40 is a total delay amount of the essential delay amount and the adjustment delay amount.

Note that the wire requiring delay and the wire not requiring delay are determined only after assignment of signal processing relating to components to the processors, and therefore the delay components are prepared corresponding to all of the wires here. In such a configuration, a portion of the resource in the DSP 20 is wastefully consumed, but in terms of simplification of processing, it is preferable to prepare the delay components in a uniform manner. The assignment of signal processing relating to components to processors is performed also in consideration of the processing ability required for delay processing by the delay component. This is because if the delay components are added afterwards, it may be required to change the assignment of the signal processing to processors, and in response to that the essential delay amounts corresponding to the wires may change.

As for the not-shown delay component 45, it is not necessary to provide component data corresponding thereto in the CAD data shown in FIG. 5, and existence of the corresponding delay component 45 can be indicated through existence of wiring data. Its delay amount is described as data on the adjustment delay amount in the property data in the wiring data.

Further, the delay component 45 is inserted midway on the wire 44 in FIG. 8 for convenience of illustration, but if the insertion results in the wire 44 divided by the delay component 45 to cause a state in which delay may occur before and after the delay component 45, the adjustment of the delay amount becomes more difficult, thus defeating the primary purpose. Hence, the delay component 45 is actually placed immediately after an output node 46 to which the wire 44 is connected or immediately before an input node 47, thereby making it possible to perform processing in a processing procedure preventing delay from occurring between these nodes and the delay component. In this sense, it can be said that the delay component 45 is provided corresponding to the output node 46 or the input node 47.

The delay amount in the processing corresponding to each wire is designed to automatically match the fixed value as described above, thereby ensuring that the user can grasp the delay amount in each portion of the signal processing even without assignment of processing corresponding to each component to the processor. Further, since the delay amount in each portion is fixed, prediction and adjustment of the delay amount can be relatively easily performed by the user.

Next, processing executed by the CPU of the PC 30 in conjunction with the edit of the configuration of signal processing and the display of the delay amount which have been described above will be described.

Figure 9:
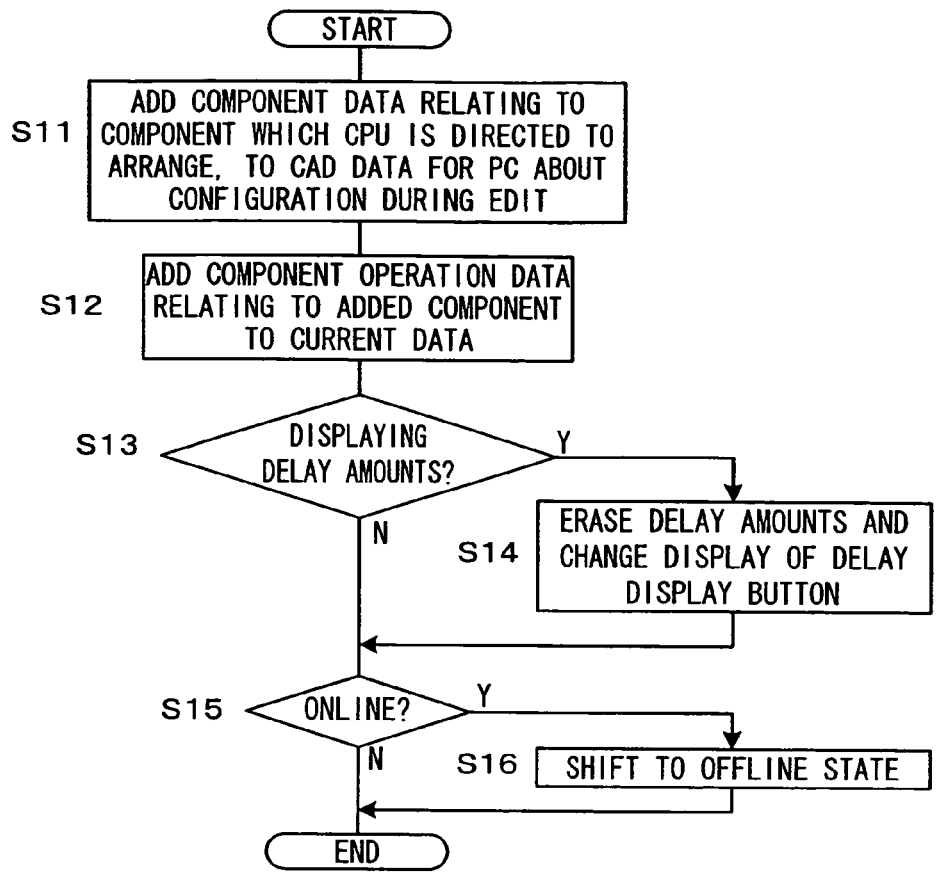
FIG. 9 is a flowchart of processing executed by a CPU of the PC shown in FIG. 1 when it is directed to arrange a new component on the CAD screen.

First of all, a flowchart of processing in the case when the CPU is directed to arrange a new component on the CAD screen 40 is shown in FIG. 9.

When directed to arrange a new component on the CAD screen 40, the CPU of the PC 30 starts the processing shown in the flowchart in FIG. 9. Then, the CPU first adds component data relating to the component which the CPU is directed to arrange, to the CAD data for PC about the configuration during edit, and also adds component operation data indicating parameters relating to the added component to the current data (S11, S12). The CPU, if it is displaying delay amounts, erases them and changes display of the delay display button 42 to a delay non-display state (S13, S14), and the CPU, if it is online state, shifts to an offline state (S15, S16) and then ends the processing.

With the above processing, the CPU can add a new component to the signal processing configuration. Note that the reason why the CPU erases the delay amounts in the case of displaying the amounts is that the contents of assignment of the signal processing to the processors may change with the addition of the new component, and as a result the delay amounts corresponding to wires may change. Therefore, it is not always necessary to erase the delay amounts in the case of the FIX mode. Besides, the case of deletion of a component can be treated by processing in which the portions of "add" or "added" in S11 and S12 are replaced with "delete" or "deleted."

Figure 10:
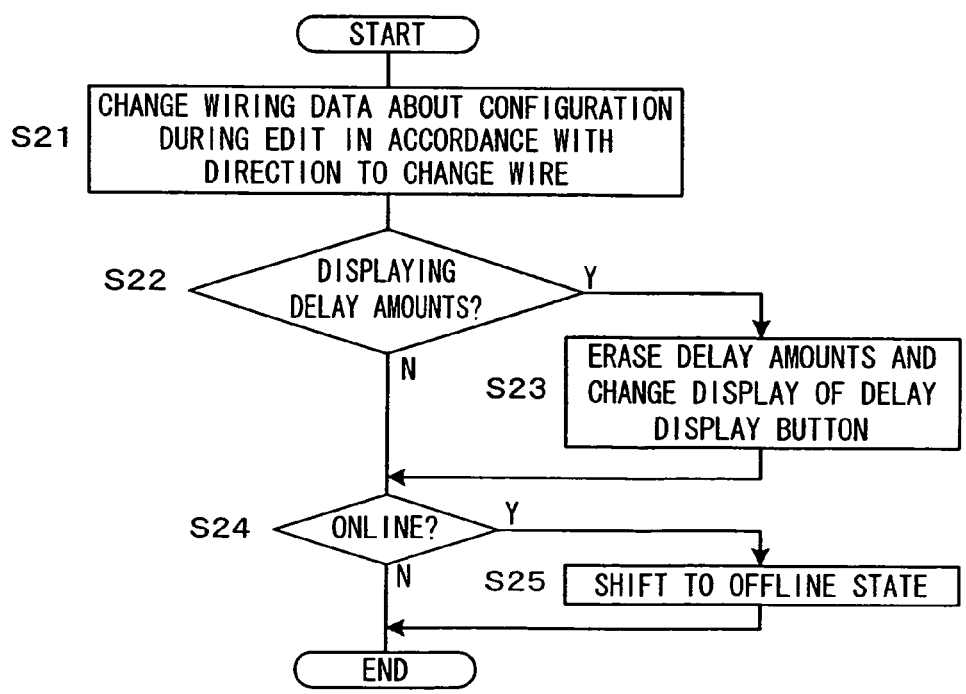
FIG. 10 is a flowchart of processing executed when similarly directed to change a wire on the CAD screen.

Next, a flowchart of processing in the case when the CPU is directed to change a wire on the CAD screen 40 is shown in FIG. 10.

When directed to change a wire (addition, deletion, change of a connected node, or the like) on the CAD screen 40, the CPU of the PC 30 starts the processing shown in the flowchart in FIG. 10. Then, the CPU first changes wiring data about the configuration during edit in accordance with the direction to change the wire (S21). The change can be addition and deletion of the wiring data itself and change of contents of the wiring data.

Then, the CPU, if it is displaying delay amounts, erases them and changes display of the delay display button 42 (S22, S23), and the CPU, if it is online state, shifts to an offline state (S24, S25) and then ends the processing.

With the above processing, the CPU can change the wire in the signal processing configuration. Note that the reason why the CPU erases the delay amounts in the case of displaying the amounts is, the same reason as that in the case of FIG. 9, that the change of a wire may affect the assignment of signal processing to the processors because of addition, deletion, or the like of the not-shown delay component associated with the wire.

Figure 11:
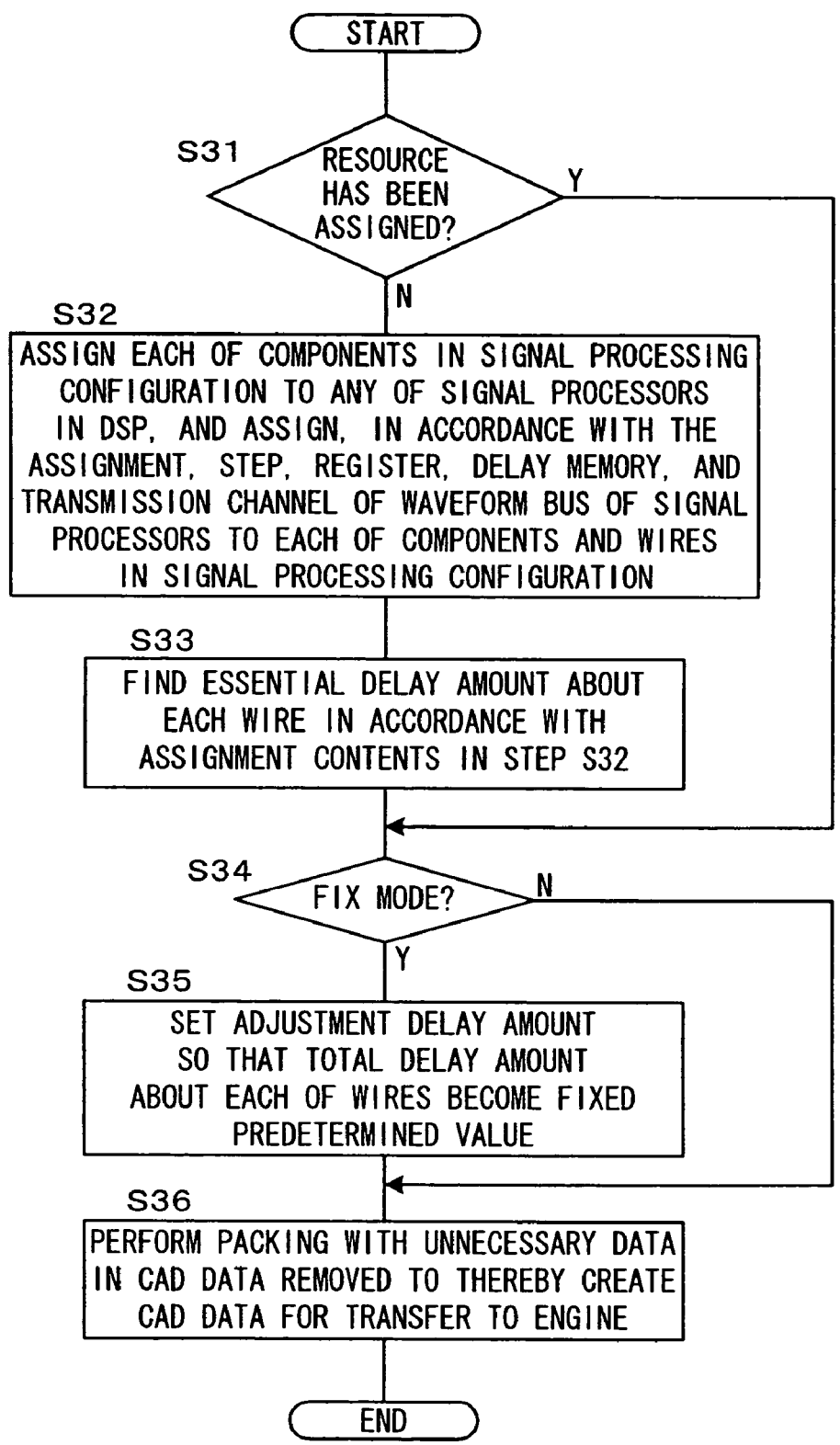
FIG. 11 is a flowchart of processing executed when similarly directed to perform compile.

Next, a flowchart of processing in the case when the CPU is directed to perform compile is shown in FIG. 11.

When detecting the direction to compile the signal processing configuration during edit, by press of the compile button 41 or the like, the CPU of the PC 30 starts the processing shown in FIG. 11. The CPU then determines whether the resource has been assigned or not (S31). When the assignment has not been completed, the CPU assigns each of the components in the signal processing configuration to any of the signal processors 21 to 24 in the DSP 20, and assigns, in accordance with the assignment, the resource in the DSP 20 to each of the components and wires in the signal processing configuration (S32), and finds the essential delay amount about each wire in accordance with the assignment contents in step S32 (S33).

Note that the value of the essential delay amount can be found by classification as shown in Table 1. Further, it is conceivable that the determination in step S31 can be YES when edit affecting the assignment of the resource has not been performed after the previous assignment of the resource. Simply, the determination may be YES when none of the components and wires is changed.

Then, if it is in the FIX mode, the CPU sets the adjustment delay amount so that the total delay amount about each of the wires becomes a fixed predetermined value (two sampling cycles here) (S34, S35).

Thereafter, the CPU performs packing with unnecessary data in the CAD data removed to thereby create CAD data for transfer to engine (S36), and ends the processing.

In the above processing, the CPU of the PC 30 functions as an assigning device in step S32, and the CPU of the PC 30 functions as an adjusting device in step S35.

Further, with the above processing, the CPU can compile the configuration of signal processing edited in the PC 30 to generate data in a form suitable for processing on the mixer engine 10 side. The CPU then transfers the data to the mixer engine 10 to allow the engine 10 to create a microprogram in accordance with the data so that the DSP 20 executes the program, whereby the signal processing in the configuration edited in the PC 30 can be executed on the mixer engine 10 side.

In the FIX mode, even if assignment of the signal processing to the processors has been once performed and then assignment is performed again for reassignment, the adjustment delay amount can be set to an appropriate value for each assignment, thereby preventing the delay amount, which occurs in the signal processing corresponding to each wire, from changing between before and after the reassignment.

Figure 12:
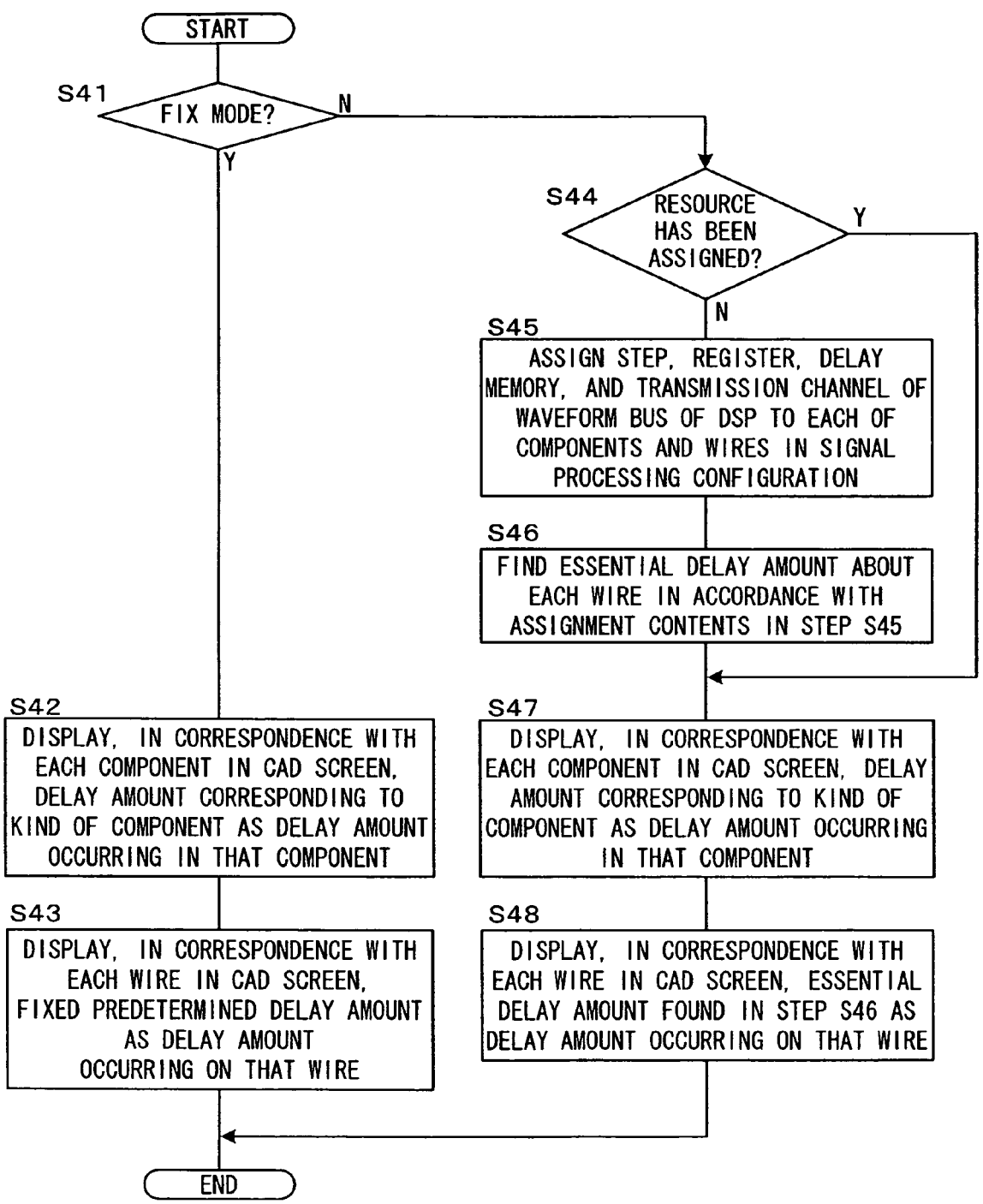
FIG. 12 is a flowchart of processing executed when similarly directed to display a delay amount.

Next, a flowchart of processing when the CPU is directed to display the delay amount is shown in FIG. 12.

When directed to display the delay amount by press of the delay display button 42 or the like, the CPU of the PC 30 starts the processing shown in FIG. 12.

When the FIX mode is ON in step S41, the CPU displays, in correspondence with each component in the CAD screen 40, a delay amount corresponding to the kind of the component as the delay amount occurring in that component (S42), and displays, in correspondence with each wire in the CAD screen 40, a fixed predetermined delay amount (two sampling cycles here) as the total delay amount occurring on that wire (S43) and ends the processing. Note that in actually performing signal processing, the delay amount displayed here is the total of the essential delay amount and the adjustment delay amount, but it is not essential to find these mounts individually because these amounts are not individually displayed here.

On the other hand, when the FIX mode is not ON in step S41, the processing proceeds to step S44. When the resource has not been assigned, the CPU assigns the resource similarly to the case of steps S32 and S33 in FIG. 11 (S45, S46).

Thereafter, the CPU displays the delay amount corresponding to the kind of the component (S47) as in the case of step S42, displays the essential delay amount found in step S46 in correspondence with each wire in the CAD screen 40 (S48), and ends the processing.

In the above processing, the CPU of the PC 30 functions as a second display controller in steps S42, S43, S47, and S48, and the CPU of the PC 30 functions as an assigning device in step S45.

With the above processing, the CPU can display the delay amount corresponding to each portion of the signal processing according to ON/OFF of the FIX mode. Further, even when ON/OFF of the FIX mode is changed in the state where the delay amount is being displayed, the CPU can execute the processing shown in FIG. 12 after the change to perform display suitable for the mode.

It is also conceivable to design the mixer system which has been described above such that the user can set the delay amount in the processing corresponding to each wire on the CAD screen 40. In this case, it is considered to enable the delay amount to be set as one property of the wire.

Figure 13:
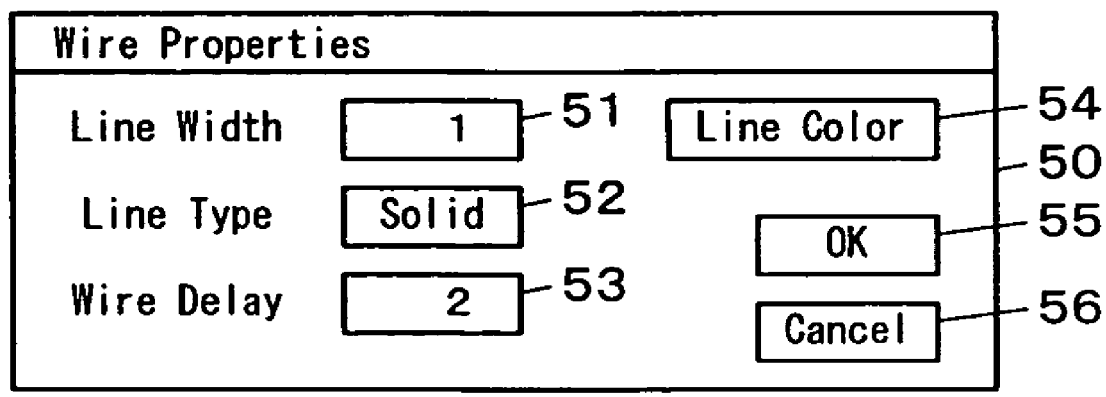
FIG. 13 is a diagram showing a display example of a property setting screen of a wire displayed on the display of the PC shown in FIG. 1.

A display example of a property setting screen of a wire for the above-described setting is shown in FIG. 13.

In the mixer system which has been described above, when the PC 30 is directed to perform property setting by double clicking or the like on the CAD screen 40, the PC 30 displays a property setting screen 50 as shown in FIG. 13 on a display to accept setting of properties relating to a designated wire.

Through this screen, the CPU accepts designation of a line width and line type when it displays a wire within the CAD screen 40 via a line width input section 51, a line type input section 52, and accepts designation of a delay amount about the wire via a delay amount input section 53, and further displays a screen for designating a color to accept designation of a color of the wire when a color setting button 54 is pressed. When an OK button 55 is pressed, the CPU enables the setting contents, while when a cancel button 56 is pressed, the CPU abandons the inputted setting contents and returns to the property setting screen.

It should be noted that it is possible to input a value freely into the delay amount input section 53 on this screen. However, when the FIX mode is ON, it is preferable to allow only an amount to be set which is equal to or greater than a fixed predetermined value initially set as the delay amount on each wire, and to issue a warning and request reentry if the inputted value is smaller than the predetermined value. If a value smaller than the fixed predetermined value is allowed to be set, the value may be unachievable depending on contents of assignment of components to the processors, which will be against the purpose of the FIX mode which is intended to prevent change in the delay amount at the same point.

It is preferable to ensure that when the essential delay amount about an object wire is already known, an amount smaller than that essential delay amount cannot be set irrespective of ON/OFF of the FIX mode. This is because such a delay amount cannot be realized in actual processing.

Further, in compile processing or the like, when the amount set as the delay amount becomes smaller than the essential delay amount with change in the essential delay amount, or when the amount set as the delay amount becomes a value smaller than the fixed predetermined value in the FIX mode, the setting contents may be automatically changed to match the essential delay amount or the fixed predetermined value. Conversely, if there is no such problem, it is preferable, respecting the setting by the user, to avoid the contents set by the user from being automatically changed.

Note that what is set in the delay amount input section 53 on the screen shown in FIG. 13 is the total of the essential delay amount and the adjustment delay amount, and therefore it is preferable that when the essential delay amount is determined in compiling or the like, the CPU of the PC 30 automatically determines the adjustment delay amount about each wire based on the setting contents.

Figure 14:
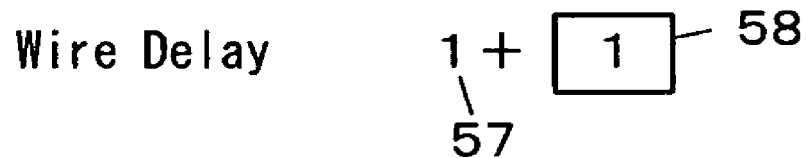
FIG. 14 is a diagram showing another configuration example of a delay amount input section within the property setting screen shown in FIG. 13.

Alternatively, it is also possible to display the delay amount input section as one shown in FIG. 14, in which the CPU displays the essential delay amount about a wire concerned in an essential delay amount display section 57 and accepts setting of the adjustment delay amount in an adjustment delay input section 58. In this case, the user directly designates the delay amount by the not-shown delay component 45 shown in FIG. 8. Further, it is also conceivable that when the resource has not been assigned and thereby the essential delay amount has not been determined, a temporary reference value is displayed in the essential delay amount display section 57 based on the assignment contents of the past.

It is also considered to design the above-described adjustment of the delay amount such that it can be automatically performed as well as manually performed. For example, it is preferable that in a component for mixing a plurality of signals such as a mixer, the signals inputted from input nodes are identical in phase. Hence, it is preferable to adjust the delay amount on each wire so that the delay amount from the input section of the overall signal processing configuration to each input node of a component requiring adjustment is fixed irrespective of path. Such an arrangement ensures that by making signals identical in phase when they are inputted into the mixer engine 10, the phase of the signal to be processed can be made identical even during the processing, resulting in output with high quality. Note that when the FIX mode is ON, the delay amount corresponding to each wire is known even without assignment of the resource, so that such an automatic adjustment becomes possible by relatively simple processing.

Besides, it is preferable to ensure that the adjustment of the delay amount can be performed even through use of a delay component displayed on the CAD screen 40 as well as through the above-described not-shown delay component. This is because it may be more preferable that insertion of delay can be clearly indicated, such as delay set according to the arrangement position of a speaker or the like.

When the FIX mode is ON, it is also conceivable to configure such that the delay amount corresponding to each wire cannot be manually changed from the fixed predetermined value, and that if it is required to adjust the delay amount to match the phase or the like, another delay component displayed on the CAD screen 40 is inserted for the adjustment. Such a configuration allows the delay amount corresponding to each wire to be kept at the fixed predetermined value even when adjustment of the delay amount is performed, so that the delay amount at each portion can be kept intuitively understandable.

Further, as for the assignment of the resource, it is also conceivable that to what processor the signal processing relating to each component is assigned and in what order the signal processing is performed in the processor can be designated by the user for each component of all or at least part of components among a plurality of components included in the CAD data for PC. Such a configuration makes it possible to control the essential delay amount for each wire to some extent on the user side when the FIX mode is OFF.

Furthermore, it is also preferable to configure the assignment of the resource such that the automatic assignment of the resource as in step S32 for the plurality of components included in the CAD data for PC can be performed in an order of components different from that in the previous time because the user may want to try an assignment different from the current one.

As a matter of course, modification may be made, when necessary, on the configuration of hardware or data, the contents of the display screens, the contents and procedure of processing, and so on, in addition to the above-described change, without departing from the spirit of the invention.

Further, the editing device of the invention is not limited to PC, and the editing device and the mixer engine are not necessarily to be in one-to-one correspondence. Besides, the above-described edit program can be run to ensure that one PC can control a plurality of mixer engines and that one mixer engine may be connected to different computers and controlled depending on time and situation.

Further, the above-described program of the invention is stored in the HDD of the PC 30 and so on in advance, and the same effect can be obtained also by providing the program recorded on a non-volatile recording medium (memory) such as a CD-ROM, a flexible disc, or the like and causing the CPU to load for execution the program from the memory to the RAM of the PC 30 or by causing the CPU to download for execution from an external device including a recording medium recording the program thereon or an external device storing the program in a memory such as an HDD or the like.

As has been described, according to the editing device, the audio signal processing system or the program of the invention, it is made possible that the user easily grasps a delay amount when editing a configuration of signal processing preformed in an audio signal processing device, the delay amount occurring when the audio signal processing device performs the signal processing. Accordingly, an audio signal processing system with a high operability in editing the signal processing configuration can be provided.

TABLE 1

| Assignment state of components before and after wiring | Essential delay amount |
| --- | --- |
| Different signal processors | 2 sample periods |
| Same signal processor, but processing relating to following component is at earlier step than processing relating to preceding component | 1 sample period |
| Same signal processor, and processing relating to preceding component is at earlier step than processing relating to following component | 0 sample periods |

What is claimed is:

1. An editing device that edits a configuration of signal processing performed in an audio signal processing device, the audio signal processing device having an audio signal processor comprising a plurality of signal processors and a plurality of transmission paths between said signal processors, for performing the signal processing on audio signals input to the audio signal processing device every sampling cycle, the configuration of signal processing comprising a plurality of components each having one or more input terminals and one or more output terminals and wires each connecting the output terminals and the input terminals of said components, the editing device editing the configuration by adding or deleting components and wires to the configuration in response to an editing operation by a user, the editing device comprising:

a first display controller that causes a display to display each image of said components and wires included in the edited configuration of signal processing;

an assigning device that assigns signal processing relating to each of said components included in the edited configuration of signal processing to any of said signal processors, the signal processing relating to a component being performed by the signal processor in the audio signal processing device to which the component is assigned by said assigning device; and a second display controller that obtains, for each component in the configuration of signal processing, a component delay amount, using a sampling cycle as a unit, for which an audio signal is delayed as the audio signal is processed relating to the component in the audio signal processing device, obtains, for each wire in the configuration of signal processing, a wire delay amount, using a sampling cycle as a unit, for which an audio signal is delayed as the audio signal is transmitted from one component to another component relating to the wire in the audio signal processing device, in accordance with the assignment of signal processing by said assigning device, and causes the display to display the component delay amount in correspondence with each of said components and to display the wire delay amount in correspondence with each of said wires.

2. An editing device according to claim 1, further comprising an adding device that adds a not-shown delay component into the edited configuration of signal processing in correspondence with each of said wires included in the configuration, said delay component further delaying an audio signal passing through said wire, by an adjustment delay amount, and no image of said not-shown delay component being displayed on the display by said first display controller, wherein said assigning device assigns the signal processing relating to each of said components in the edited configuration to any of said signal processors so as to ensure processing ability required for the delay processing relating to said delay component, and wherein said second display controller causes the display to display, as the delay amount corresponding to said wire, a total amount of an essential delay amount unavoidably caused relating to said wire by the assignment of the signal processing and the adjustment delay amount.

3. An editing device according to claim 2, further comprising a setting device that sets the adjustment delay amount in response to a setting operation by the user.

4. An editing device according to claim 2, further comprising an adjusting device that adjusts the adjustment delay amount such that the total delay amount is a fixed value equal to or greater than the maximum amount of the essential delay amount, in accordance with a result of the assignment of the signal processing when said assigning device performs the assignment.

5. An editing device according to claim 4, further comprising a setting device that, after said adjusting device adjusts the adjustment delay amount, changes the adjustment delay amount, to an amount greater than the adjustment delay amount set by said adjusting device, in response to a setting operation by the user.

6. An editing device according to claim 4, wherein, when said assignment device performs a first assignment of signal processing and then performs a second assignment of the signal processing, said adjusting device adjusts the adjustment delay amount independently for the first assignment and for the second assignment so that the total delay amount relating to each of said wires does not change between the first assignment and the second assignment.

7. An audio signal processing system, comprising:

an editing device that edits a configuration of signal processing performed in an audio signal processing device, the audio signal processing device having an audio signal processor comprising a plurality of signal processors and a plurality of transmission paths between said signal processors, for performing the signal processing on audio signals input to the audio signal processing device every sampling cycle, the configuration of signal processing comprising a plurality of components each having one or more input terminals and one or more output terminals and wires each connecting the output terminals and the input terminals of said components, the editing device editing the configuration by adding or deleting components and wires to the configuration in response to an editing operation by a user; and an audio signal processing device having an audio signal processor comprising a plurality of signal processors and a plurality of transmission paths between said signal processors, for performing the signal processing in the configuration edited by said editing device on audio signals input to the audio signal processing device every sampling cycle, wherein said editing device comprises:

a first display controller that causes a display to display each image of said components and wires included in the edited configuration of signal processing;

an assigning device that assigns signal processing relating to each of said components included in the edited configuration of signal processing to any of said signal processors, the signal processing relating to a component being performed by the signal processor in the audio signal processing device to which the component is assigned by said assigning device; and a second display controller that obtains, for each component in the configuration of signal processing, a component delay amount, using a sampling cycle as a unit, for which an audio signal is delayed as the audio signal is processed relating to the component in the audio signal processing device, obtains, for each wire in the configuration of signal processing, a wire delay amount, using a sampling cycle as a unit, for which an audio signal is delayed as the audio signal is transmitted from one component to another component relating to the wire in the audio signal processing device, in accordance with the assignment of signal processing by said assigning device, and causes the display to display the component delay amount in correspondence with each of said components and to display the wire delay amount in correspondence with each of said wires.

8. A computer program containing program instructions executable by a computer, and causing said computer to execute:

an editing process of editing a configuration of signal processing performed in an audio signal processing device, the audio signal processing device having an audio signal processor comprising a plurality of signal processors and a plurality of transmission paths between the signal processors, for performing the signal processing on audio signals input to the audio signal processing device every sampling cycle, the configuration of signal processing comprising a plurality of components each having one or more input terminals and one or more output terminals and wires each connecting the output terminals and the input terminals of the components, said editing of the configuration being performed by adding or deleting components and wires to the configuration in response to an editing operation by a user;

a first display control process of causing a display to display each image of the components and wires included in the configuration of signal processing edited by the editing device;

an assigning process of assigning the signal processing relating to each of the components included in the edited configuration of signal processing to any of the signal processors, the signal processing relating to a component being performed by the signal processor in the audio signal processing device to which the component is assigned in said assigning process; and a second display control process of obtaining, for each component in the configuration of signal processing, a component delay amount, using a sampling cycle as a unit, for which an audio signal is delayed as the audio signal is processed relating to the component in the audio signal processing device, obtaining, for each wire in the configuration of signal processing, a wire delay amount, using a sampling cycle as a unit, for which an audio signal is delayed as the audio signal is transmitted from one component to another component relating to the wire in the audio signal processing device, in accordance with the assignment of signal processing in said assigning process, and causing the display to display the component delay amount in correspondence with each of the components and to display the wire delay amount in correspondence with each of said wires.

* * * * *